United States Patent Office 3,072,627
Patented Jan. 8, 1963

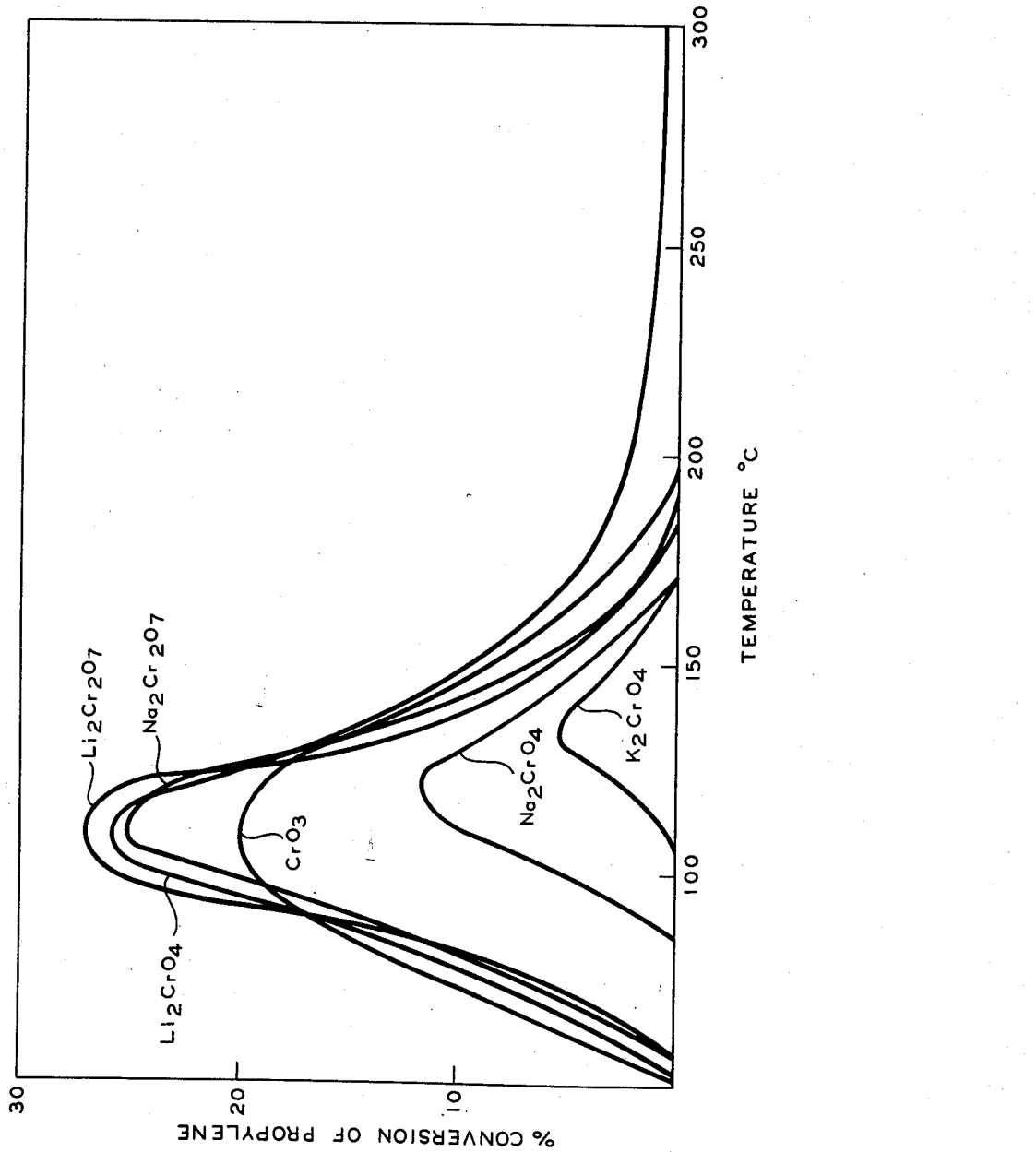

3,072,627
POLYMERIZATION WITH A CATALYST OF AN ALKALI METAL CHROMATE ON SILICA-ALUMINA
Vernon C. F. Holm, Bartlesville, Okla., assignor to Phillips Petroleum Company, a corporation of Delaware
Filed Mar. 12, 1956, Ser. No. 570,782
6 Claims. (Cl. 260—93.7)

This invention relates to the polymerization of olefins. In one aspect, the invention relates to an improved catalyst for the polymerization of olefins.

Reactions for polymerizing olefins are well known in the art and are generally carried out in the presence of catalysts. Recently, a novel catalyst system for use in polymerization of olefins to form unique polymers has been disclosed by J. P. Hogan and R. L. Banks in copending U.S. application Serial No. 476,306, filed December 20, 1954. The catalyst described in this application comprises chromium oxide, associated with at least one other oxide, such as silica and/or alumina. In accordance with the instant invention, an improved chromium-containing catalyst is provided which exhibits a higher activity than the catalyst described in the Hogan and Banks application.

It is an object of this invention to provide an improved process for the production of olefin polymers.

Another object of the invention is to provide an improved catalyst for use in the polymerization of olefins.

A further object of the invention is to provide a process for the polymerization of 1-olefins, such as ethylene and propylene.

Other and further objects and advantages of the invention will become apparent to those skilled in the art upon consideration of the accompanying disclosure and the drawing which illustrates graphically the polymerization activity of several catalyst systems.

Broadly speaking, the instant invention resides in the use of a novel catalyst comprising an alkali metal chromate and at least one oxide selected from the group consisting of silica, alumina, zirconia and thoria in an olefin polymerization process. When using a catalyst comprising at least one of the aforementioned oxides promoted with an alkali metal chromate in an olefin polymerization process, a polymer of higher molecular weight and melting point is produced than when using under similar conditions a chromium oxide-containing catalyst.

In a preferred embodiment of the invention, a catalyst comprising a metal chromate selected from the group consisting of lithium chromate, lithium dichromate and sodium dichromate and at least one oxide selected from the group consisting of silica, alumina, zirconia, and thoria is employed as the polymerization catalyst. I have discovered that a catalyst containing either lithium or sodium dichromate or lithium chromate exhibits higher polymerization activity in that a higher conversion of olefin to the desired high molecular weight polymer is obtained than when using a chromium oxide-containing catalyst or a catalyst containing one of the other alkali metal chromates of this invention.

The components of the catalyst system of this invention include an alkali metal chromate and at least one oxide, which when composited or associated with the alkali metal chromate forms a catalyst which is active for the polymerization of polymerizable organic compounds. Examples of alkali metal chromates which can be used include potassium chromate, potassium dichromate, sodium chromate, sodium dichromate, lithium chromate, and lithium dichromate. However, it is preferred to use lithium or sodium dichromate and lithium chromate in the catalyst composition because of the higher conversion obtained when employing these chromium-containing compounds.

The non-chromium containing component of my catalyst system is generally selected from the group consisting of silica and alumina, although other oxides, such as zirconia and thoria, can be used. The silica is preferably used in the form of a gel while the alumina can be used in the form of alumina gel, activated naturally occurring alumina or bauxite. While it is generally preferred to utilize the silicon oxide or aluminum oxide in a partially dry or activated state so that it can be more easily handled, it is often more desirable to use hydroxides or hydrated or hydrous oxides, such as alumina trihydrate, as the starting material in preparing the catalyst of this invention. Materials which are preferred as catalyst component in addition to the alkali metal chromate are composites of silica and alumina. The silica and alumina in such a composite can vary in proportions over a wide range, for example, from 0.5 weight percent up to 99.5 weight percent silica, the remainder being alumina. A preferred range for the silica-alumina composite is from 50 to 95 weight percent silica and from 5 to 50 weight percent alumina. A particularly effective material is a commercially available cracking catalyst in the form of a coprecipitated composite gel of silica and alumina comprising about 90 weight percent silica and about 10 weight percent alumina. A composite prepared by impregnating partially dried silica gel with a solution of an aluminum salt and subsequently drying and igniting can also be employed. It is also within the scope of this invention to utilize alumina and/or silica which has been pretreated with HF, as described in the cited copending application of Hogan and Banks.

The catalyst of this invention should contain at least 0.1 and ordinarily not over 25 weight percent chromium. However, chromium contents as high as 50 percent or higher are operative, a minor proportion, based on total catalyst, being preferred. Generally, the chromium content of the catalyst ranges from about 1 to about 6 weight percent, especially where ethylene is being polymerized.

Methods which are well known in the art, such as impregnation, can be used in preparing the catalyst of this invention. It is also within the scope of this invention to prepare the catalyst using the micronization technique disclosed by E. W. Pitzer in copending U.S. application Serial No. 459,862, filed October 1, 1954, now Patent 2,927,915. In preparing the catalyst composition of this invention by impregnation, the oxide component, such as silica-alumina, is immersed in a solution of the alkali metal chromate whereupon the oxide absorbs a portion of the solution. Following impregnation the catalyst composite is drained, dried, and finally heated and activated at a temperature in the range of 450 to 1500° F., preferably, 750 to 1500° F., with a stream of gas. It is preferred to utilize a gas which contains oxygen and which is substantially water-free. However, it is within the scope of the invention to utilize inert gases, such as carbon dioxide or nitrogen. The catalyst composition of this invention can also be prepared by impregnating the oxide separately with, for example, lithium hydroxide and chromic acid, followed by drying and activation. One preferred method of preparing the catalyst involves the impregnation of silica-alumina with a solution of an alkali metal chromate, such as lithium dichromate, drying the impregnated material at a temperature between about 400 to 900° F. for a period of about 3 hours and calcining the dried impregnated material preferably in a non-reducing atmosphere (e.g., $N_2$) and more desirably in an oxygen-containing atmosphere at a temperature between 800 and 1150° F., preferably between 900 and 1100° F., for a period of at least 3 hours. The catalyst so prepared can be used as such or it can be comminuted, admixed with Sterotex (hydrogenated corn oil), or other suitable binder, pelleted, and heated at a high temperature to remove the Sterotex and activate the catalyst.

Materials which can be polymerized in accordance with the process of this invention include monoolefins and diolefins, including cyclic olefins, such as vinylcyclohexane, cyclohexene, and cyclopentadiene. In order to produce a solid or tacky polymer, it is ordinarily necessary that the feed olefin be an aliphatic 1-olefin having a maximum chain length of 8 carbon atoms and no chain branching nearer the double bond than the 4-position. Examples of such 1-olefins are ethylene, propylene, 1-butene, 1-pentene, 1-hexane, and 5-methyl-1-hexane. It is also within the scope of this invention to copolymerize a mixture of olefins, for example, to prepare a copolymer of ethylene and propylene. Olefins other than 1-olefins can be polymerized in the presence of the catalyst of this invention, but in general liquid polymers and very little solid polymer are formed. Examples of such olefins include 2-butene and 2-methyl-2-pentene.

While the process of this invention can be carried out without a solvent, it is usually desirable to utilize a solvent as a reaction medium and/or a medium for the recovery of polymer. Suitable solvents are hydrocarbons which can be advantageously used include paraffins such as those having from 3 to 12 carbon atoms per molecule, for example 2,2,4-trimethylpentane (isooctane), normal decane, normal hexane, isopentane, and the like. A preferred class of solvents are naphthenic hydrocarbons, such as cyclohexane and methylcyclohexane.

The contacting of the reactants with the catalyst can be effected by methods known in the art. One method comprises dissolving the reactant olefin in a solvent of the type described and contacting the resulting solution in the liquid phase with the catalyst. In this method of operation, a solution of from 1 to 20 weight percent of the olefin in the solvent is generally preferred. Another method comprises contacting the olefin in the gaseous or vapor phase with the catalyst, whereby substantially all of the solid polymer accumulates on the surface of the catalyst and is removed in a subsequent step by the use of a solvent of the type described. The use of a moving or gravitating bed or a fluidized fixed bed of catalyst is also within the scope of this invention. Another method of contacting comprises suspending the catalyst (e.g., 20 to 50 mesh or finer) in the solvent in which the feed olefin is dissolved and reacting the mixture in a reactor provided with a stirrer which maintains the catalyst in suspension. The polymer can later be completely dissolved in the solvent and recovered therefrom by distillation or by cooling followed by filtration. This type of operation is disclosed in more detail in the copending application of Hogan and Francis, Serial No. 445,042, filed July 22, 1954. In any event, the product polymer can be recovered from solution in the solvent by flashing, distillation, or cooling and filtration.

The polymerization conditions, in general, comprise a temperature in the range of 100 to 450° F., a pressure in the range of 0 to 700 p.s.i.g., preferably 400 to 500 p.s.i.g., and a liquid hourly space velocity in the range of 0.1 to 20, preferably 1 to 6. When ethylene is the reactant olefin and the catalyst is used in the form of a stationary or fixed bed, a temperature in the range 275 to 375° F. is preferred. When ethylene is the reactant olefin and a mobile catalyst, e.g., in the form of a suspension in a liquid solvent, is used, a temperature in the range 200 to 350° F. is preferred. Temperatures in the upper part of the latter range produce a brittle polymer whereas those in the lower part of the range produce a relatively flexible polymer. When the reactant olefin is propylene or a higher olefin, the preferred reaction temperature is in the range 150 to 250° F. When the olefin is reacted in admixture with a hydrocarbon solvent, a pressure sufficient to maintain the reaction mixture preponderantly in the liquid phase is satisfactory.

After a period of use, the activity of the catalyst declines, even when most of the deposited polymer has been recovered by treatment of the catalyst with a solvent. When the decline in activity reaches such a point that the conversion per pass reaches an undesirably low level, the catalyst can be regenerated by contact with an oxidizing gas such as air, which can be diluted with an inert gas. The removal of organic matter by combustion is preferably followed by an activation treatment as previously described herein. Commercially available olefins, particularly ethylene, often contain small amounts of impurities such as oxygen, carbon monoxide, and water, which are deleterious to the catalyst of this invention. The concentration of these materials should not exceed 1000 parts per million, and preferably they should not exceed 100 parts per million. The olefin feed can be treated by methods well known in the art in order to remove these materials; however, it is to be understood that small amounts can be tolerated if necessary.

A more complete understanding of the invention may be obtained by referring to the following illustrative example, which is not intended, however, to be unduly limitative of the invention.

EXAMPLE

A series of runs were carried out in which propylene was polymerized employing the below listed catalysts.
(1) 90 silica–10 alumina impregnated with chromium oxide ($CrO_3$).
(2) 90 silica–10 alumina impregnated with sodium dichromate ($Na_2Cr_2O_7$).
(3) 90 silica–10 alumina impregnated with sodium chromate ($Na_2CrO_4$).
(4) 90 silica–10 alumina impregnated with lithium dichromate ($Li_2Cr_2O_7$).
(5) 90 silica–10 alumina impregnated with lithium chromate ($Li_2CrO_4$).
(6) 90 silica–10 alumina impregnated with potassium chromate ($K_2CrO_4$).

The several catalysts were prepared as follows so as to have a chromium content of about 3 weight percent. A 16–30 mesh, dried, coprecipitated, 90 silica–10 alumina gel carrier was impregnated with the solutions indicated below and allowed to soak for about 15 minutes. Excess liquid was removed by suction and the impregnated catalyst was then dried in an evaporating dish over a hot plate with constant stirring. After drying in an oven, the catalyst was heated to 932° F. in a current of dry air and held at this temperature for five hours. In the case of the chromium oixde-containing catalyst, the catalyst was prepared by impregnation with $Cr(NO_3)_2 \cdot 6H_2O$ while in the case of the alkali metal chromate-containing catalysts, solutions of $Na_2Cr_2O_7$, $Na_2CrO_4$, $Li_2Cr_2O_7$, $Li_2CrO_4$, and $K_2CrO_4$, as applicable, were used.

The polymerization runs were carried out in a glass reactor equipped with an axial thermocouple well which permitted temperature measurements at the top and bottom of the catalyst bed. The reactor was mounted in a vertical tube furnace fitted wtih a heavy copper sleeve for temperature equalization. Dried propylene was admitted at the top from a calibrated flowrator and the reaction mixture passed through an ice cooled trap below the reactor. The unreacted propylene not condensed in the trap was passed through a second flowrator. Thus, with a given flow rate of propylene, readings of the second flowrator made possible a calculation of the instantaneous values for the conversion of propylene to dimers, trimers and higher polymers.

Prior to each of the several runs, the reactor was charged with 10 ml. of 16–30 mesh catalyst and with a slow stream of dry nitrogen flowing, the furnace was heated to 752° F. The furnace was held at this temperature for about an hour after which it was allowed to cool overnight to room temperature. With the ice-cooled receiver in place, the nitrogen was then cut off and pure grade propylene was charged to the reactor at a gaseous hourly space rate of 250. The furnace was turned on at a voltage such as to attain 572° F. in two hours. Flowrator and temperature readings were made at 5 minute intervals during each of the runs.

The results of the several polymerization runs are shown graphically in the drawing. From a consideration of the curves shown in the drawing, it is seen that the catalyst prepared with lithium chromate or dichromate and sodium dichromate gave a higher conversion of propylene than a catalyst prepared with chromium nitrate. The catalyst containing chromium oxide ($CrO_3$), lithium chromate or dichromate, or sodium dichromate all reached a maximum conversion at about 230° F. while with the catalyst containing either sodium chromate or potassium chromate the maximum conversion was shifted to about 248° F. and 284 F., respectively. At the same time, the conversion was reduced substantially, especially when using the catalyst containing potassium chromate.

During these runs, most of the polymer remained on the catalyst when the run was completed at 572° F. However, as the temperature was increased above 572° F. with dry nitrogen flowing over the catalyst at a constant rate, the polymer melted and drained off. It was found that the polymer on the catalysts containing alkali metal chromates and dichromates required somewhat higher temperatures for complete polymer removal. This is an indication that higher molecular weight polymers were formed when using the alkali metal chromate-containing catalysts. In the table below there is listed the temperatures required in certain of the runs for complete polymer removal from the catalysts.

*Table*

| Catalyst: | Temperature at which polymer melted and drained off, ° F. |
|---|---|
| $Li_2CrO_4$ and 90 silica–10 alumina | 851 |
| $Na_2Cr_2O_7$ and 90 silica–10 alumina | 857 |
| $Na_2CrO_4$ and 90 silica–10 alumina | 855 |
| $CrO_3$ and 90 silica–10 alumina | 806 |

Polymers produced in accordance with this invention have utility in applications where solid plastics are used. The product polymers are useful for making molded articles, pipe, containers for liquids, protective coatings, and additives for lubricating oils.

It will be apparent to those skilled in the art that variations and modifications of the invention can be made from a study of the foregoing disclosure. Such variations and modifications are believed to be clearly within the spirit and scope of the invention.

I claim:
1. A method for polymerizing propylene which comprises contacting propylene with a catalyst obtained by depositing an alkali metal chromate on silica-alumina and heating at a temperature in the range of 450 to 1500° F. in a non-reducing atmosphere for a time sufficient to activate said catalyst for said method.

2. A method for polymerizing propylene which comprises contacting propylene with a catalyst obtained by depositing an alkali metal chromate on silica-alumina and heating at a temperature in the range of 450 to 1500° F. in a non-reducing atmosphere for a time sufficient to activate said catalyst for said method, at a temperature in the range of 100 to 450° F., and recovering the resulting polymer.

3. A method for polymerizing propylene which comprises contacting propylene with a catalyst obtained by depositing a metal chromate selected from the group consisting of lithium chromate, lithium dichromate, and sodium dichromate on silica-alumina and heating at a temperature in the range of 450 to 1500° F. in a non-reducing atmosphere for a time sufficient to activate said catalyst for said method, at a temperature in the range of 100 to 450° F., in the presence of a hydrocarbon solvent, inert and liquid under conditions of the method, at a pressure sufficient to maintain said solvent in liquid phase, and recovering the solid polymer so produced.

4. A method in accordance with claim 3 wherein said metal chromate is lithium chromate.

5. A method in accordance with claim 3 wherein said metal chromate is lithium dichromate.

6. A method in accordance with claim 3 wherein said metal chromate is sodium dichromate.

References Cited in the file of this patent

UNITED STATES PATENTS

| 2,184,235 | Groll et al. | Dec. 19, 1939 |
| 2,332,276 | Stahly | Oct. 19, 1943 |
| 2,825,721 | Hogan et al. | Mar. 4, 1958 |
| 2,888,497 | Pitzer | May 26, 1959 |

OTHER REFERENCES

Senter: Text Book of Inorganic Chemistry, D. Van Nostrand Co., N.Y. (1919), pages 537–538.

Chem. Abstracts, vol. 45, col. 2701f (1951).